June 16, 1964    R. C. FERGASON    3,137,114
SPINDLE GUARD FOR COTTON PICKERS
Filed Aug. 17, 1962    3 Sheets-Sheet 1

Inventor
Rector C. Fergason
By W. Girot
Attorney

June 16, 1964
R. C. FERGASON
3,137,114
SPINDLE GUARD FOR COTTON PICKERS
Filed Aug. 17, 1962
3 Sheets-Sheet 2
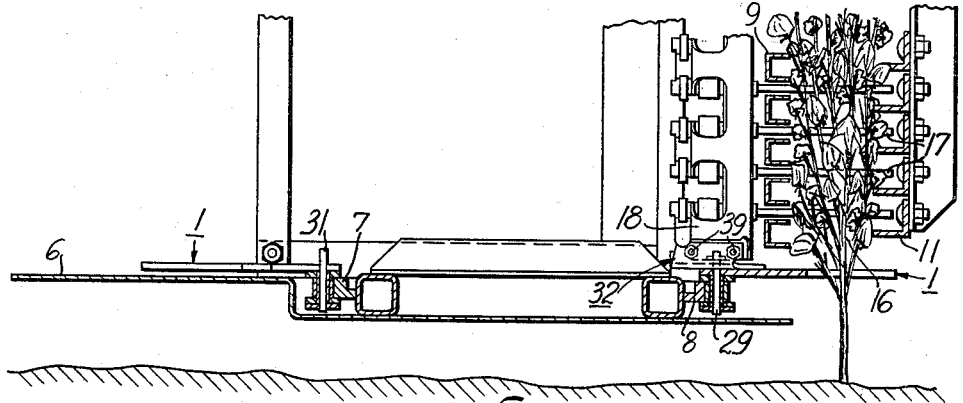
Fig. 2
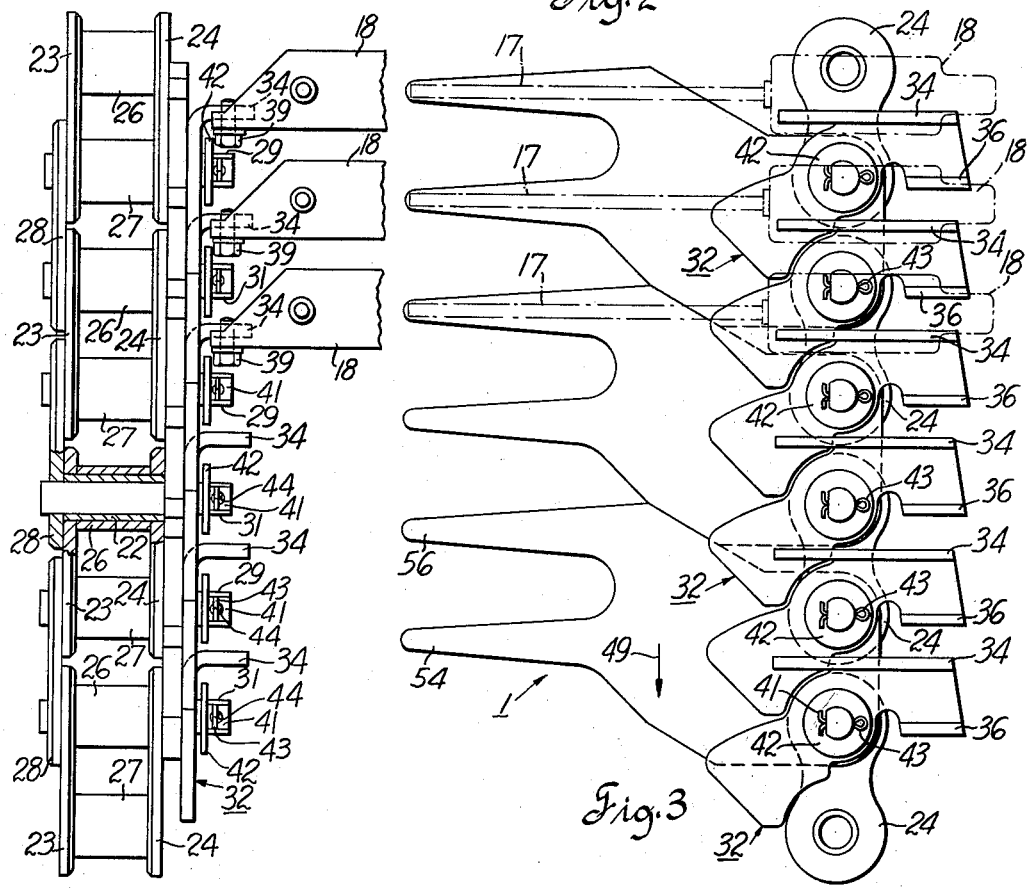
Fig. 4
Fig. 3
Inventor
Rector C. Fergason
By W. Girard
Attorney

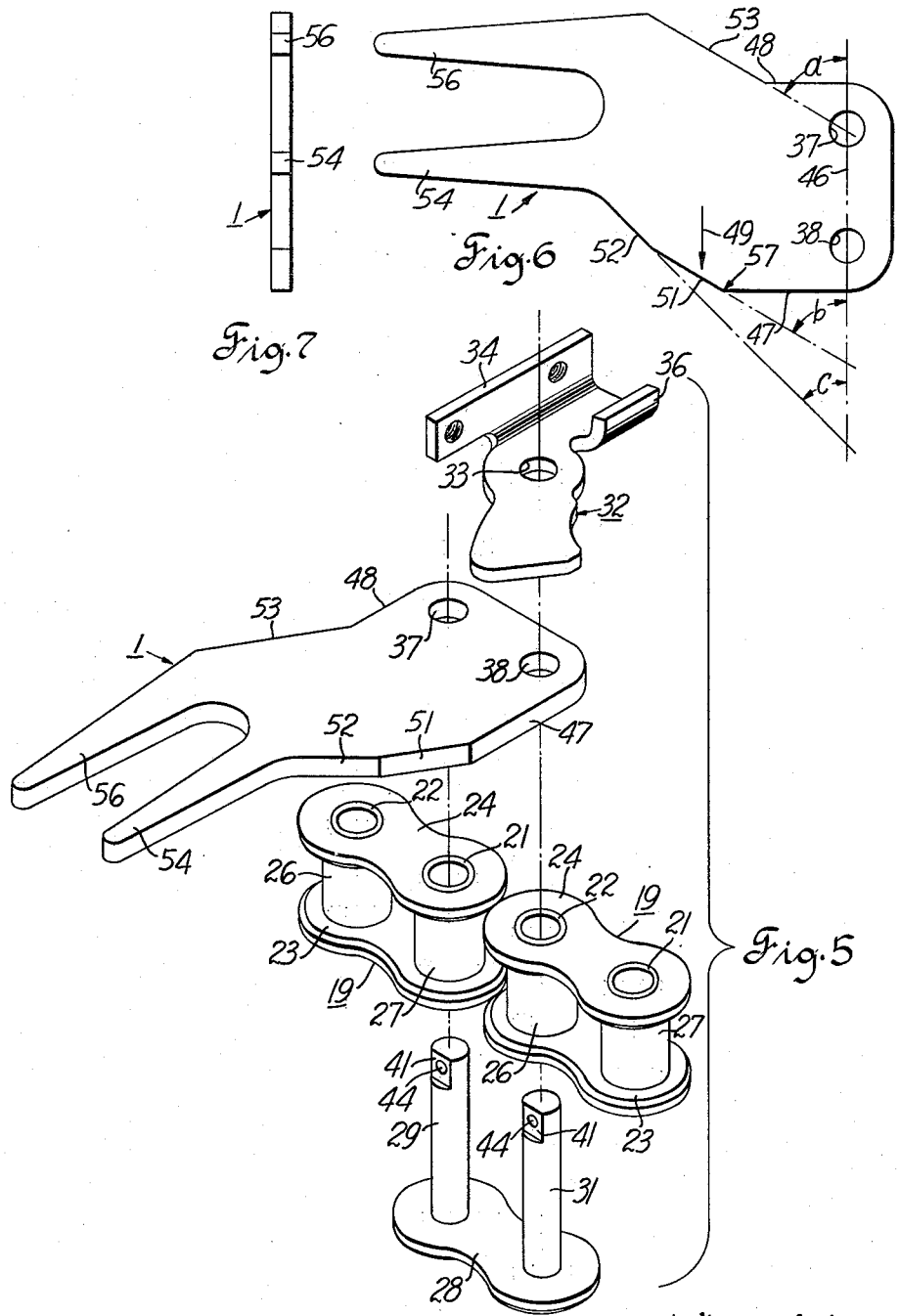

United States Patent Office 3,137,114
Patented June 16, 1964

3,137,114
SPINDLE GUARD FOR COTTON PICKERS
Rector C. Fergason, La Porte, Ind., assignor to Allis-Chalmers Manufacturing Company, Milwaukee, Wis.
Filed Aug. 17, 1962, Ser. No. 217,667
6 Claims. (Cl. 56—42)

The invention relates to cotton picking machines, and it is concerned more particularly with a component unit of such machines which comprises a series of spindle carrying slats and a mechanism for moving the slats in upright positions around an endless oblong path.

According to well-known principles of construction and operation of cotton picking machines of the mentioned type, a picking tunnel is provided on a wheeled vehicle frame; and the picking spindles are moved rearwardly through the tunnel at precisely the same rate of speed at which the entire machine is driven forwardly in the field. If, for any reason, as for instance due to slippage of the propelling wheels, the machine should move forwardly at a slower speed than that at which the spindles are moved rearwardly through the picking tunnel while the picking spindles are in engagement with a plant row, bending and possibly breaking of the spindles would result.

In order to overcome this difficulty, spindle guards have heretofore been employed which cause the cotton plants to be torn out of the ground and to move rearwardly along with the spindles through the picking tunnel, in the event that the machine advances at a slower than normal speed or not at all, while the spindle drive mechanism continues to operate at normal speed. Such a spindle guard arrangement is shown, for instance, in U.S. Patent 2,671,298, issued March 9, 1954, to R. C. Fergason, for Cotton Picker.

As shown in the mentioned earlier patent, and as heretofore used, the conventional spindle guard arrangement comprises a series of relatively strong guard fingers, one for each vertical row of picking spindles, and a number of such fingers are preferably combined to form a unit which lends itself for convenient handling and mounting. The usual practice during the past has been to combine four such guard fingers into one unit and to utilize the lower carrying chain on which the spindle slats are mounted, to also mount the four fingered guard units for travel along the same oblong path as the spindle slats.

An important requirement for the proper functioning of a picking unit which is equipped with guard fingers in the mentioned manner is to provide for vertical stability for the guard fingers and also to prevent buckling of the carrying chain under the heavy loads to which it becomes subjected when a cotton plant is torn out of the ground.

As heretofore employed, spindle guard finger arrangements of the mentioned character have failed to meet these requirements in a practical and satisfactory manner.

One of the difficulties which have been encountered has been that the guard fingers lost their vertical stability sooner or later due to wear, depending on operating conditions. The loosened guard fingers then came in contact with the floor plate of the picking unit, and dragging of the guard fingers over the floor plate in operation caused the fingers to wear through the floor with the ultimate result that the entire picking unit would fail.

Generally, it is an object of the present invention to overcome the hereinabove outlined difficulties and shortcomings in a practical and fully satisfactory manner.

More specifically, it is an object of the invention to provide an improved spindle guard arrangement wherein a chain, slat hinges and spindle guards are assembled in a novel manner affording improved vertical stability of the guard fingers.

Another object of the invention is to provide an improved spindle guard arrangement of the mentioned character presenting fewer points of articulation and therefore being subject to less wear than the spindle guard arrangement disclosed in the mentioned earlier patent.

A further object of the invention is to provide an improved spindle guard arrangement in conjunction with a chain having sprocket tooth engaging rollers of greater lengths than previously used roller chains of the same overall height.

A still further object of the invention is to provide an improved cotton picker of the type wherein spindle slats are mounted in upright positions between endless upper and lower carrying chains, and wherein spindle guards of unique construction are associated with the lower chain in such a manner as to truss the chain against buckling under the heavy loads to which it becomes subjected when a cotton plant is uprooted by a spindle guard.

A still further object of the invention is to provide an improved multiple prong spindle guard structure which is extremely simple in construction and efficient in operation and which lends itself to manufacture at relatively low costs.

These and other objects and advantages are attained by the present invention, various novel features of which will be apparent from the description herein and the accompanying drawings disclosing an embodiment of the invention and will be more particularly pointed out in the appended claims.

In the drawings:

FIG. 2 is an elevational end view in section on line II—II of FIG. 1, the view of FIG. 2 including a spindle slat not shown in FIG. 1, and also a cotton plant within the picking tunnel;

FIG. 3 is an enlarged top view of part of an endless chain and associated slat hinges, spindle slats and spindle guards incorporated in the picking unit shown in FIG. 1 and appearing in the left part of FIG. 2;

FIG. 4 is a side view of the parts shown in FIG. 3, one of the chain joints in FIG. 4 being shown in section;

FIG. 5 is an exploded perspective view of a pair of preassembled chain links, a spindle guard and other associated parts;

FIG. 6 is an enlarged top view of the spindle guard shown in FIG. 5; and

FIG. 7 is a side view of the spindle guard shown in FIG. 6.

Figure 1:
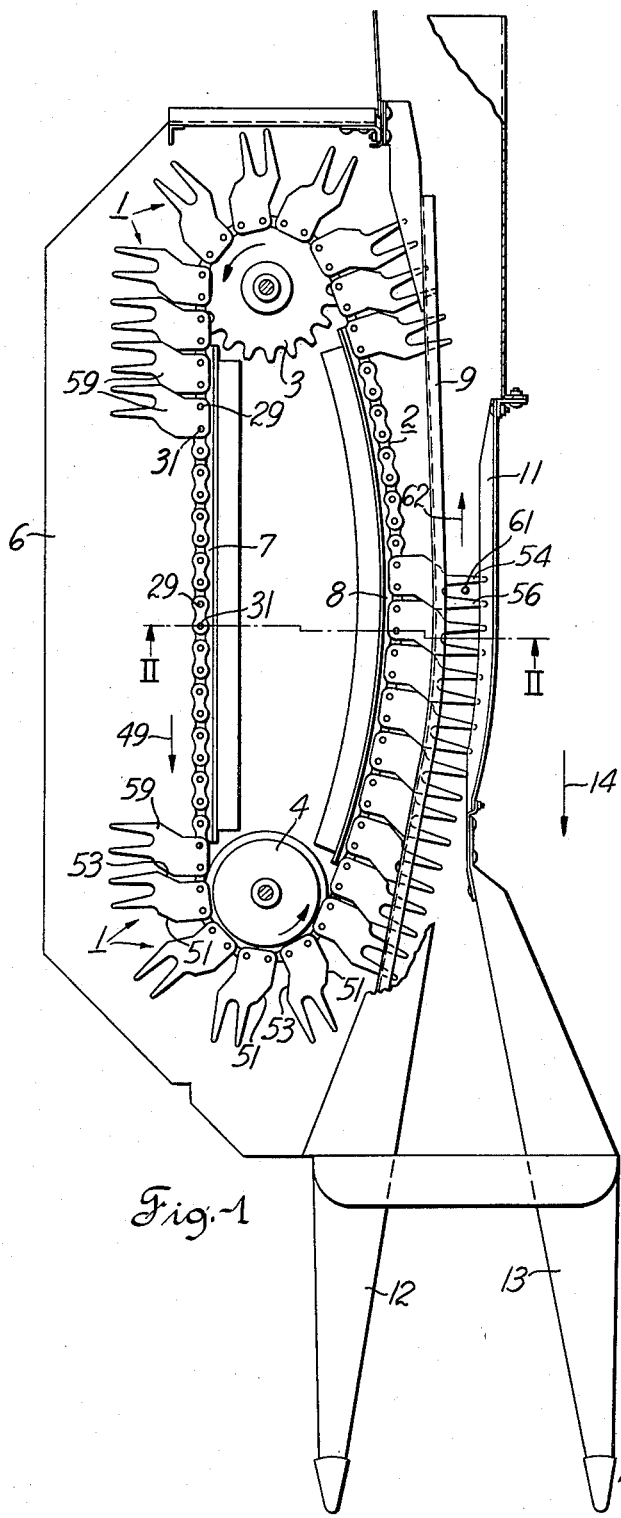
FIG. 1 is a schematic top view, with parts omitted and others shown in section, of a cotton picking unit adapted for mounting on a vehicle frame not shown.

As shown in FIG. 1, a series of spindle guards 1 are mounted on an endless chain 2 for travel on an endless oblong path about a rear driving sprocket wheel 3 and a front idler 4. A frame structure on which the sprocket wheel 3 and front idler 4 are mounted is of conventional construction and includes a floor plate 6, a straight guide rail 7 and a curved guide rail 8 for the chain 2. Opposite side walls of a picking tunnel are designated by the reference characters 9 and 11 in FIGS. 1 and 2, and plant dividers 12 and 13 are conventionally mounted ahead of the picking tunnel for guiding cotton plants into the picking tunnel as the picking unit comprising the parts shown in FIGS. 1 and 2 is moved in the direction of arrow 14 through a cotton field.

As will be understood by those skilled in the art and as is explained in detail in the hereinbefore mentioned earlier patent, U.S. 2,671,298, cotton lint is removed from the plants in the picking tunnel by rotating picking spindles. FIG. 2 shows a cotton plant 16 compressed between the tunnel side walls 9 and 11, picking spindles 17 penetrating the plant 16 and part of a vertical slat 18 mounting the spindles 17. The lower end of the slat 18 is pivotally connected with the chain 2 in the manner illustrated by FIGS. 3 and 4 which will be explained more fully hereinbelow. An upper endless chain, not shown, is conventionally provided and connected with the upper end of the slat 18 for maintaining the slat upright during operation of the machine.

Referring now to the spindle guards 1 and their mounting on the chain 2, the following should be noted. The chain 2 comprises, generally, two types of links, namely inner links which are of conventional construction and outer links which are specially constructed in accordance with the present invention. Two of the inner links are each generally designated in FIG. 5 by the reference character 19. Each inner link 19 comprises a pair of tubular cross members or pin bushings 21 and 22 which are connected by a pair of vertically spaced inner side bars 23 and 24, and rollers 26 and 27 are rotatably mounted on the bushings 21 and 22, respectively, between the side bars 23 and 24. The inner links 19 are preferably preassembled by press fitting the inner links 23, 24 upon the bushings 26 and 27.

Each pair of relatively adjacent inner links is connected by an outer link in the manner illustrated by FIGS. 3, 4 and 5. Each outer link comprises a lower outer side bar 28, a pair of pivot pins 29 and 31 which are riveted to the side bar 28 and extend, respectively, through pin bushings 21 and 22 of relatively adjacent inner links 19; and a spindle guard 1 which is press fitted upon the pins 29, 31 and serves as an upper side bar of the outer link.

The pivot pins 29 and 31 of the outer links serve not only as mounting pins for the spindle guards 1 but also as mounting pins for lower slat hinges 32. FIG. 5 shows the general configuration of one of the slat hinges 32 in perspective, and reference may be had to U.S. Patent 2,723,519, issued on November 15, 1955, to R. C. Fergason for a complete description of this particular type of slat hinge. For a full understanding of the present invention, it will suffice to point out that the slat hinge 32 has an irregularly shaped plane body portion with a circular mounting hole 33 in it, an upstanding flange portion 34 for connection with the lower end of an associated spindle slat 18 and a short upstanding stop flange 36. In the assembled condition of the chain 2 and its associated slat hinges 32, the pivot pins 29 and 31 extend upwardly through circular apertures 37 and 38, respectively, of the spindle guards 1, and through the mounting holes 33 of the slat hinges 32, there being one slat hinge 32 connected with each pin 29 and one slat hinge 32 with each pin 31. Each slat hinge 32 mounts a spindle slat 18 in the manner indicated by FIG. 4, cap screws 39 being provided to detachably secure the lower ends of the spindle slats to the upstanding flanges 34 of the associated slat hinges.

The mounting pin receiving apertures 37 and 38 of the spindle guard 1 are dimensioned to provide for press fitted engagement with the pivot pins 29 and 31, respectively. That is, the diameters of the pivot pins 29 and 31 and the diameters of the apertures 37 and 38 are held to tolerances which afford pin diameters several thousandths of an inch larger than the diameters of the apertures 37 and 38. The mounting aperture 33 of the slat hinge 32, on the other hand, is held to a dimension somewhat larger than the diameters of the pins 29 and 31 so that the slat hinges will be freely rotatable on their respective pivot pins.

During assembly of the chain 2, the holes 37 and 38 of a spindle guard 1 are aligned with the pivot pins 29 and 31, respectively, of an outer link after the pivot pins have been inserted through the bushings 21 and 22, respectively, of a pair of relatively adjacent inner links 19. Heavy pressure, as by means of a hydraulic press, is then exerted upon the spindle guard 1 and pins 29 and 31 so as to force the spindle guard into its assembled position at the upper side of the inner links, as indicated by FIG. 4.

Press fitted positioning of the spindle guards 1 on the pins 29, 31 in the described manner leaves upper portions of the pins protruding from the upper sides of the spindle guards. Each of these protruding pin portions has a flat 41 milled into its side next to the upper end of the pin as best shown in FIG. 5. In the assembled condition of the chain, a relatively short cylindrical portion of each pin extends between the upper face of the spindle guard and the lower end of the flat 41. The slat hinges 32 are rotatably seated on these cylindrical pin portions. Washers 42 are nonrotatably seated on the flattened upper end portions of the pins 29, 31 in overlying relation to the slat hinges 32. Cotter pins 43 or roll pins are installed in diametrical holes 44 (FIG. 5) of the pins 29, 31 above the washers 42 to keep them in place.

The unique configuration of the spindle guards 1 is best shown in FIG. 6. As shown in this figure, the transversely spaced mounting pin receiving apertures 37 and 38 are located on a center line 46 which extends at right angles to parallel side edges 47 and 48 of the mounting end portion of the spindle guard. The arrows 49 in FIGS. 1, 3 and 6 indicate the direction in which the spindle guards 1 travel relative to frame structure of the picking unit during operation of the machine. Accordingly, the parallel edges 47 and 48 will be designated as front and rear edges, respectively, of the spindle guard mounting end portion. An oblique body portion of the spindle guard merges with the mounting end portion in transversely extending relation to the axes of the apertures 37, 38. The oblique body portion presents relatively inclined forward edges 51 and 52, and an inclined rearward edge 53. A pair of stalk engaging fingers 54 and 56 of the spindle guard 1 have a center spacing from each other which is substantially equal to the pivot pin spacing or pitch of the chain assembly 2. The guard fingers 54 and 56 are connected with each other and with the mounting end portion of the spindle guard by the intermediate body portion of the guard. The intermediate body portion extends obliquely between the mounting end portion of the guard and the guard fingers so that in the mounted condition of the spindle guard on the associated pivot pins of the chain assembly 2, as shown in FIG. 1, the guard fingers and pivot pins will be offset from each other in the direction of movement of the chain assembly.

In the illustrated embodiment of the invention, the guard fingers 54, 56, the oblique body portion and the mounting end portion of the spindle guard are coplanar as best indicated by FIG. 7. Further, the oblique body portion has an outer continuous straight edge portion 53 between the mounting end portion and one of the guard fingers, and two outer, relatively inclined edge portions 51 and 52 between the mounting end portion and the other of the guard fingers. The continuous straight rearward edge portion 53 and the straight forward edge portion 51 in proximity to the mounting end portion extend parallel to each other in inclined relation to the center line 46, the angle of inclination of the rearward edge portion 53 being indicated by the reference character $a$ in FIG. 6 and of the same magnitude as the angle of inclination of the forward edge portion 51 which is indicated in the same figure by the reference character $b$. The forward edge portion 52 of the oblique body portion, remote from the mounting end portion of the spindle guard, is inclined relative to the center line 46 by an angle $c$ which is smaller than the angles $a$ and $b$.

The parallel front and rear edges 47 and 48 of the mounting end portion of the spindle guard intersect the inclined forward and rearward edges 51 and 53, respectively, of the oblique body portion at unequal distances from the center line 46. As shown in FIG. 6, the intersection point 57 between the front edge 47 and the inclined forward edge portion 51 is spaced from the center line 46 a distance which is greater than the distance between the center line 46 and the intersection point between the rear edge 48 and the inclined rearward edge 53 of the oblique body portion of the spindle guard.

Referring to FIG. 1, it will be noted that the oblique body portion 59 of each of the spindle guards 1 presents parallel forward and rearward edge portions 51 and 53, respectively, in inclined relation to the direction of straight line travel of the chain 2 at the nonpicking side of the unit. The widths of the oblique body portions 59 between the parallel edge portions 51 and 53 thereof is such that alignment of any relatively adjacent pair of the outer link units for straight line travel will bring relatively adjacent inclined edge portions 51 and 53 into abutting relation with each other and thereby truss the chain 2 against buckling.

The path of travel of the spindle guards 1 at the picking side of the unit as shown in FIG. 1 is somewhat arcuate, and there will be a slight clearance, too small to show in FIG. 1, between the relatively opposite edges of the oblique body portions which on the nonpicking side of the unit are in abutting relation to each other. Such small clearance between relatively opposite edge portions 51 and 53 of successive spindle guards 1 at the picking side of the unit, however, does not objectionally affect the mentioned trussing function of the spindle guards.

The trunk of a cotton plant is indicated in FIG. 1 by the reference character 61 and is straddled by the guard fingers 54 and 56 of one of the spindle guards 1. In the fully assembled picking unit, vertical rows of picking spindles, not shown in FIG. 1, overlie the guard fingers 54 and 56 at the picking side of the unit, in the manner indicated by FIG. 2, the positioned relationship of the spindle slats 18, picking spindles 17 and guard fingers 54, 56 at the picking side of the unit conforming with the relative positions in which these parts are shown, for purposes of explanation, in FIG. 3.

Under normal operating conditions, the linear speed at which the spindle guards 1 travel rearwardly in the direction of arrow 62 at the picking side of the unit is precisely the same as the ground speed at which the entire machine travels forwardly in the direction of arrow 14. Under these conditions, the trunk 61 which is straddled by the guard fingers 54 and 56 will not be uprooted while it passes through the picking tunnel. However, if for any reason the forward ground speed of the unit should become slower than the linear rearward speed of the spindle guards at the picking side of the machine, as might happen due to slippage of the propelling wheels of the machine, all the plants whose trunks are straddled by guard fingers will be uprooted and moved rearwardly through the picking tunnel along with the picking spindles which extend into these plants. In this manner, the spindles will be protected against damage.

The trussing function of the spindle guards which has been explained hereinbefore substantially prevents buckling of the chain 2 under the heavy loads to which it becomes subjected under the mentioned emergency conditions.

As shown at the left of FIG. 2, only a relatively small vertical clearance exists between the floor plate 6 of the unit and the overlying row of spindle guards 1. The strong vertical stability of the spindle guards which is afforded by their press fitted engagement with the chain pivot pins 29 and 31, keeps the guard fingers from sagging and from being dragged over the floor plate 6. The press fitted mounting of the spindle guards on the chain pivot pins is not subject to wear, and the necessary vertical stability of the chain guards will therefore be insured for the life of the chain.

It will also be noted that use of the spindle guards in lieu of conventional outer side bars of the chain 2 provides for increased length of the chain rollers 26, as compared with previously known spindle guard arrangements in which spindle guards were mounted on top of conventional roller chains. The increased length of the chain rollers permits widening of the teeth of the cooperating drive sprocket without increase of the overall height of the chain and spindle guard assembly.

It should be understood that the foregoing preferred embodiment of the invention that has been shown and described is not intended to limit the invention to the illustrated details of construction, but that the invention includes such other forms and modifications as are embraced by the scope of the appended claims.

What is claimed is:

1. In a cotton picker of the type having a series of picking spindle carrying slats mounted between upper and lower endless chains, the combination comprising, alternate inner and outer link units of said lower chain, each of said inner link units having a pair of tubular cross members connected by a pair of vertically spaced inner side bars, and each of said outer link units having an outer side bar at one side and a spindle guard member at the other side of said chain; a series of pivot pins connecting relatively adjacent pairs of said inner and outer link units; each of said spindle guard members having a pair of apertures in an end portion thereof at a center spacing from each other equal to the pitch of said lower chain and in press fitted engagement with an associated pair of said pivot pins, an oblique body portion merging with said end portion in transversely extending relation to said associated pivot pins and a pair of transversely spaced guard fingers extending from said oblique body portion in transversely offset relation to said end portion.

2. A cotton picker having a lower chain and spindle guard members connected therewith as set forth in claim 1, and wherein said oblique body portion of each of said spindle guard members presents parallel forward and rearward edge portions in inclined relation to the direction of straight line travel of said chain, the widths of said oblique body portions between said parallel edge portions thereof being such that alignment of any relatively adjacent pair of said outer link units for straight line travel will bring the relatively adjacent inclined edge portions of the guard members associated with said link units into abutting relation with each other and thereby truss said chain against buckling.

3. A spindle guard for cotton pickers of the type wherein an endless chain assembly is arranged for rearward travel along the picking side of a movable supporting structure while the latter is propelled forwardly along a plant row, said spindle guard comprising an end portion adapted for rigid mounting on a pair of successive pivot pins of said chain assembly, a pair of guard fingers at a center spacing from each other substantially equal to the pitch of said chain assembly, and an intermediate body portion connecting said guard fingers with each other and with said end portion, said intermediate body portion extending obliquely between said end portion and said guard fingers so that in the mounted condition of said spindle guard on said pivot pin said guard fingers and said pivot pins will be offset from each other in the direction of movement of said chain assembly.

4. A spindle guard as set forth in claim 3 wherein said end portion has a pair of apertures for press fitted engagement, respectively, with said pivot pins.

5. A spindle guard as set forth in claim 3 wherein said intermediate body portion has a continuous straight edge portion between said end portion and one of said guard fingers, and two relatively inclined edge portions between said end portion and the other of said guard fingers; said continous straight edge portion and one of said relatively inclined edge portions adjacent to said end portion extending parallel to each other.

6. A spindle guard for cotton pickers of the type wherein an endless chain assembly is arranged for rearward travel along the picking side of a movable supporting structure while the latter is propelled forwardly along a plant row, said spindle guard comprising an end portion having a pair of apertures for press fitted engagement with successive pivot pins, respectively, of said chain assembly, a pair of guard fingers at a center spacing from each other substantially equal to the pitch of said chain assembly, and an intermediate body portion connecting said guard fingers with each other and with said end portion; said intermediate body portion having parallel front and rear edge portions adjacent said end portion at a predetermined angle of inclination relative to a center line through said apertures; and said intermediate body portion having another forward edge portion extending between said first mentioned forward edge portion and the adjacent guard finger at an angle of inclination relative to said center line smaller than said predetermined angle.

References Cited in the file of this patent

UNITED STATES PATENTS

| | | |
|---|---|---|
| 2,268,623 | Rust | Jan. 6, 1942 |
| 2,798,353 | Fergason | July 9, 1957 |